United States Patent [19]

LeBreton

[11] Patent Number: 5,568,878

[45] Date of Patent: Oct. 29, 1996

[54] FILAMENT WOUND PRESSURE VESSEL HAVING A REINFORCED ACCESS OPENING

[75] Inventor: Edward T. LeBreton, Mentor, Ohio

[73] Assignee: ESSEF Corporation, Chardon, Ohio

[21] Appl. No.: 605,261

[22] Filed: Jan. 11, 1996

[51] Int. Cl.$^6$ ..................................................... B65D 1/16
[52] U.S. Cl. ........................... 220/465; 220/581; 220/590
[58] Field of Search .................................... 220/465, 453, 220/581, 586, 588, 589, 590, 592

[56] References Cited

U.S. PATENT DOCUMENTS

| | | | |
|---|---|---|---|
| 2,809,762 | 10/1957 | Cardona | 220/590 |
| 3,074,585 | 1/1963 | Koontz . | |
| 3,083,864 | 4/1963 | Young . | |
| 3,137,405 | 6/1964 | Gorcey | 220/590 |
| 3,449,182 | 6/1969 | Wiltshire | 220/590 X |
| 3,557,827 | 1/1971 | Marsh . | |
| 3,662,780 | 5/1972 | Marsh . | |
| 4,299,332 | 11/1981 | Pechacek . | |
| 4,369,894 | 1/1983 | Grover et al. . | |
| 4,504,530 | 3/1985 | Bliley | 220/590 X |
| 4,518,558 | 5/1985 | Anway et al. . | |
| 4,589,563 | 5/1986 | Born . | |
| 4,653,663 | 3/1987 | Holtsclaw . | |
| 4,690,295 | 9/1987 | Wills | 220/590 |
| 4,699,294 | 10/1987 | Carlin, Jr. | 220/465 |
| 4,705,468 | 11/1987 | LeBreton . | |
| 4,785,956 | 11/1988 | Kepler et al. . | |
| 4,905,856 | 3/1990 | Krogager . | |
| 4,925,044 | 5/1990 | Hembert . | |
| 5,004,120 | 4/1991 | Hembert . | |
| 5,149,105 | 9/1992 | Beaver et al. | 220/465 X |
| 5,284,996 | 2/1994 | Vickers | 220/590 X |
| 5,356,589 | 10/1994 | Sugalski . | |
| 5,388,720 | 2/1995 | Murphy | 220/581 |

FOREIGN PATENT DOCUMENTS

| | | |
|---|---|---|
| 684949 | 12/1939 | Germany . |
| 547642 | 9/1942 | United Kingdom . |

Primary Examiner—Steven M. Pollard
Attorney, Agent, or Firm—Pearne, Gordon, McCoy & Granger

[57] ABSTRACT

A filament-wound pressure vessel is disclosed which has a reinforced access opening. The pressure vessel comprises a blow-molded one piece liner having an outer surface defined by a cylindrical sidewall and oblate ellipsoidal ends. The liner defines at least one access opening into the vessel and the access opening has a cylindrical neck portion and a liner flange extending radially outwardly from an open distal end of the neck portion. A cylindrical reinforcement member surrounds the cylindrical neck portion and has a supporting flange at one end thereof, which engages and annular face of the liner flange. The reinforcement member has a radially extending supporting foot at the other end thereof, which contacts the outer surface of the liner. The reinforcement member comprises a plurality of separable arcuate segments so that it may be assembled around the cylindrical neck portion of the liner. A resin-impregnated filament-winding covers the liner and the supporting foot of the reinforcement member.

5 Claims, 2 Drawing Sheets

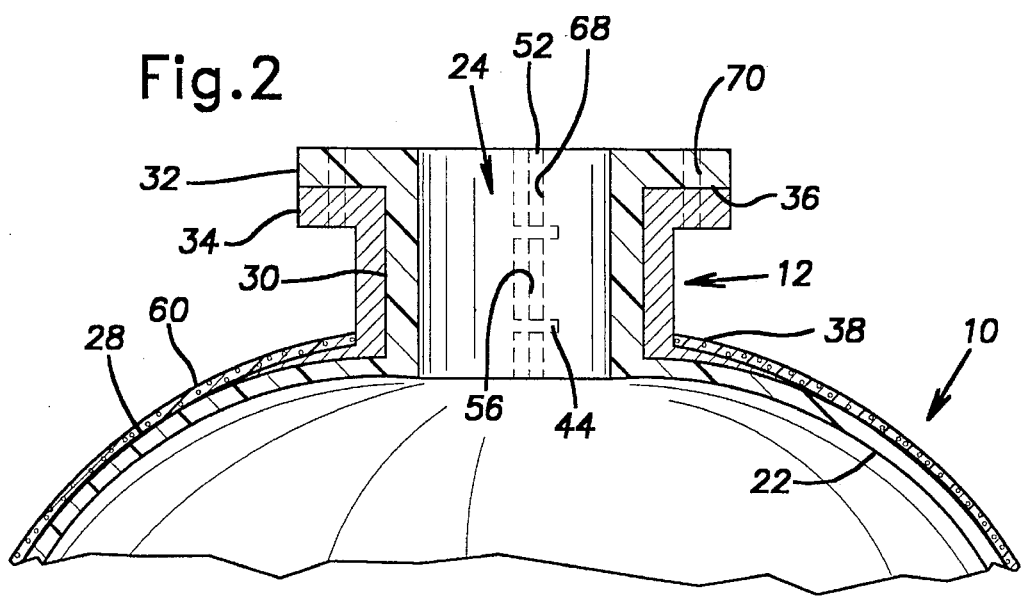
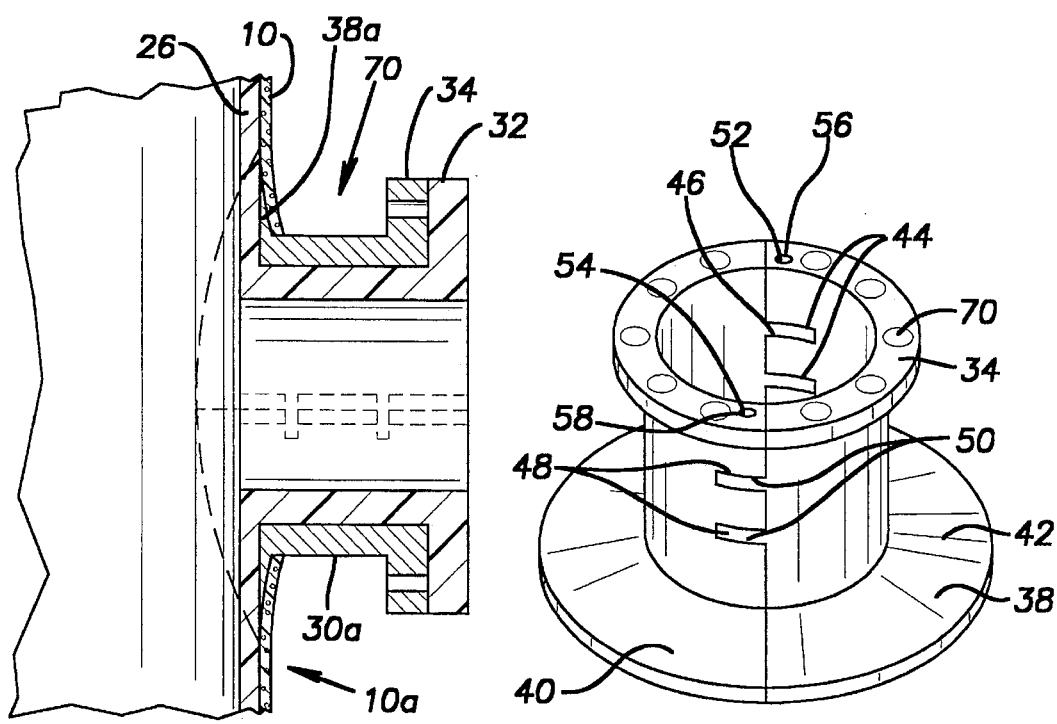

FILAMENT WOUND PRESSURE VESSEL HAVING A REINFORCED ACCESS OPENING

BACKGROUND OF THE INVENTION

1. Field of the Invention

This invention relates to pressure vessels, and more particularly, to pressure vessels having thermoplastic liners provided with access openings to the interior of the liner and a resin-impregnated filament winding over the surface of the liner.

2. Description of the Related Art

Plastic liners which serve as a winding form for a filament-wound pressure vessel are generally made by rotational casting or blow-molding techniques. A typical liner would include a cylindrical sidewall having oblate, ellipsoidal end portions, at least one of which is provided with an axial fitting adapted to be connected to a closure member or to plumbing connections. Blow-molding and rotational casting techniques each offer advantages and disadvantages in providing a tank liner. According to prior art techniques, a reinforced access fitting is provided in the liner during the molding or casting operation. In U.S. Pat. No. 4,705,468 there is disclosed a rotational casting technique wherein an access fitting is attached to the mold and is molded into the liner during the rotational casting operation. An improved rotational casting technique is set forth in U.S. Pat. No. 5,356,589. Rotational casting is advantageous in that access openings may be provided in the sidewalls of the liner in addition to axial openings in the dome of the liner. Rotational casting, however, is a relatively expensive technique due to the number of manual steps involved and the cycle time of the process.

While blow-molding techniques are more economical than rotational casting techniques, access fittings may be provided only at one end of the parison due to the nature of the blow-molding operation. A technique for producing integral reinforced openings for tank liners is set forth in U.S. Pat. No. 4,589,563. According to the teachings of that patent, a tubular plastic parison is extruded downwardly to form a mouth. During the downward travel of the tubular parison, the open mouth of the parison is grasped, expanded, and guided over a pre-formed neck portion positioned in axial alignment with the parison extrusion head and in a position to cooperate with a portion of a hollow mold so that it can be secured to the blow molded portion made from the parison. While this technique has proved to be commercially successful, it is, as was indicted above, limited to a single reinforced opening in the liner. Moreover, since the reinforced access opening is located within the interior of the liner, i.e. the parison is molded over the prefabricated access member, there is a tendency for the reinforcement member to be sucked into the interior of the liner if the interior of the pressure vessel is inadvertently subjected to a vacuum.

SUMMARY OF THE INVENTION

This invention provides a tank liner having a reinforced access opening which may be formed by simplified blow molding techniques and which has a prefabricated access opening reinforcement member located on the outside surface of the liner.

According to this invention, a blow molded one piece liner is produced according to conventional blow molding techniques. The liner has an outer surface defined by a cylindrical sidewall and oblate ellipsoidal ends. The liner has at least one access opening into the interior of the vessel. The access opening has a cylindrical neck portion and a liner flange which extends radially outwardly from the open distal end thereof. A cylindrical reinforcement member surrounds the cylindrical neck portion and has a supporting flange at one end thereof engaging the annular face of the liner flange and has a radially extending supporting foot at its other end which contacts a mating outer surface of the liner. The reinforcement member has a plurality of separable arcuate segments which may be assembled around the cylindrical neck portion of the access opening. The segments are held in an assembled condition by a plurality of pins passing through tongue and groove mating surfaces of the segments. A resin-impregnated filament is wound about the liner and the supporting foot of the reinforcement to provide structural reinforcement for the liner under pressure conditions and to securely retain the reinforcement member in its assembled position.

BRIEF DESCRIPTION OF THE DRAWINGS

FIG. 2 is an enlarged fragmentary cross-sectional view, the plane of the section being indicated by the line 2—2 in the FIG. 1;

FIG. 3 is a perspective view of a cylindrical reinforcement member according to this invention; and FIG. 4 is a fragmentary cross-sectional view of an access opening provided on the cylindrical sidewall of a pressure vessel.

DESCRIPTION OF THE INVENTION

Figure 1:
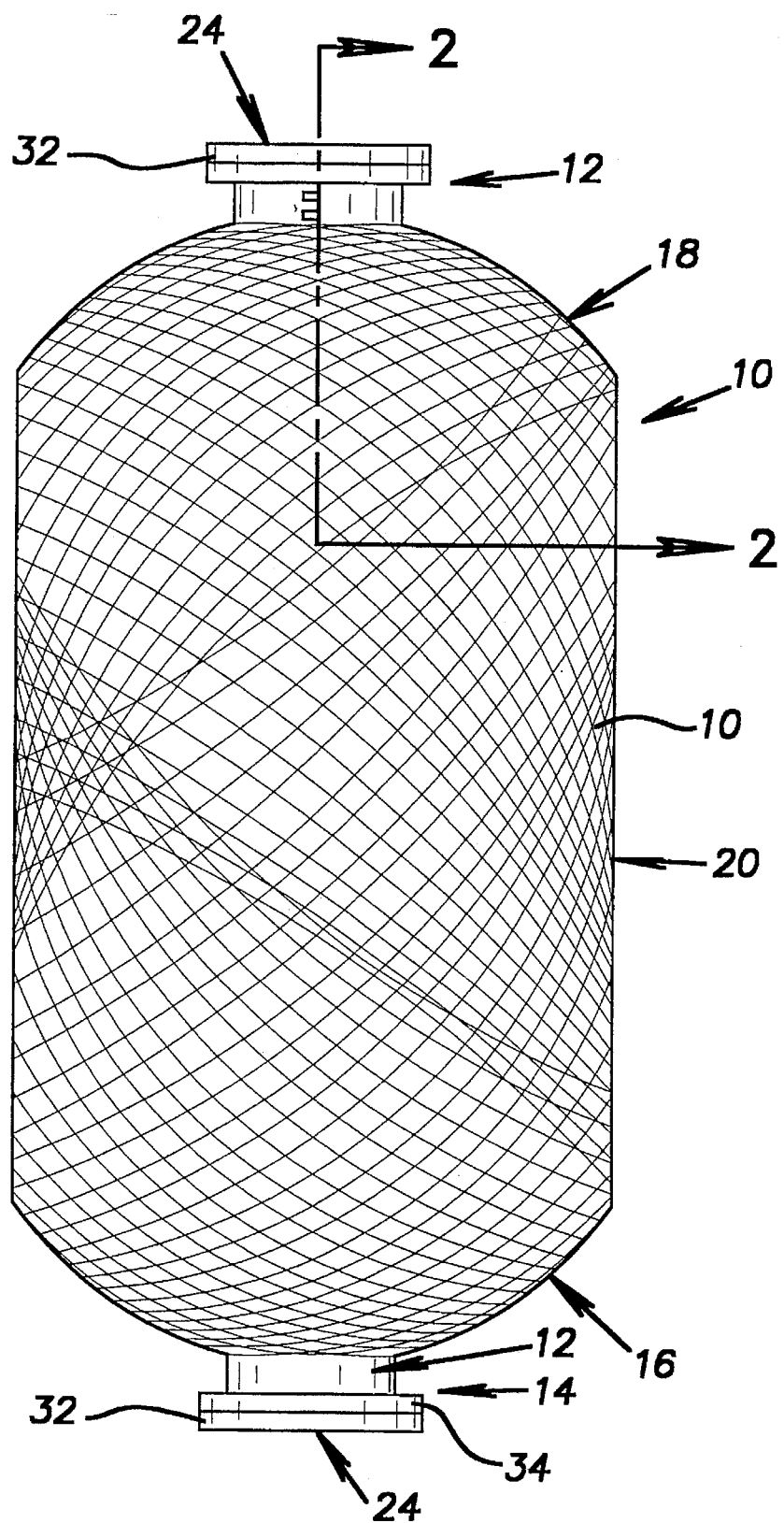
FIG. 1 is an elevational view of a filament-wound pressure vessel according to this invention.

Referring now to FIG. 1, there is illustrated a filament-wound pressure vessel 10 having reinforced access openings 12 and 14. The pressure vessel 10 has oblate ellipsoidal end portions 16 and 18 joined by a cylindrical sidewall 20. As may be seen most clearly in FIG. 2, the pressure vessel 10 further comprises a liner 22 which may be blow-molded or rotationally cast by conventional molding techniques. The liner includes a polar opening 24 and has an outside surface defined by a cylindrical sidewall 26 and oblate ellipsoidal ends 28. The opening 24 is defined by a cylindrical neck portion 30 and a liner flange 32 extending radially outwardly from an open distal end of the neck portion 30.

The cylindrical reinforcement member 12 surrounds the cylindrical neck portion 30 of the liner and has a supporting flange 34 at one end thereof which engages an annular face 36 of the liner flange 32. The reinforcement member 12 further includes a radially-extending supporting foot 38 at its other end which contacts the outer oblate surface of the liner.

The reinforcement member 12 includes a plurality of separable arcuate segments which in the illustrated embodiment of the invention comprises semi-circular segments 40 and 42. The segment 40 is provided with a pair of arcuate tongues 44 which are received in a pair of arcuate slots 46 in the segment 42. Similarly, the segment 42 is provided with a pair of arcuate tongues 48 which are received in a pair of arcuate slots 50 provided in the segment 40. The segments are assembled around the cylindrical neck portion 30 of the liner with the tongues 44 and 48 received in the slots 46 and 50. The reinforcement member 12 is retained in this assembled condition by a pair of pins 52 and 54 which are respectively received in bores 56 and 58 so that the pins 52 and 54 pass through the tongues 44 and 48. Since the pins 52 and 54 must be inserted after the segments 40 and 42 are assembled around the neck portion 30, diametrically opposed apertures 60 are provided in the liner flange 32 to receive the pins 52 and 54.

With the reinforcement member 12 mounted in place, the liner 22 is filament-wound with a resin-impregnated continuous filament in a conventional polar-winding technique to produce a filament-reinforced covering 60. As may be seen in FIG. 1, reinforcement members 12 and 14 may be provided at the ends of the pressure vessel to provide a pair of axially-aligned access openings to the pressure vessel. If only a single axial opening is required, however, the reinforcement member 14 may be replaced by a blank winding mount such as those shown and described in U.S. Pat. Nos. 4,785,956 and 3,557,827.

Referring now to FIG. 4, a side-access opening 70 may be provided. The access opening 70 is provided by fusing a cylindrical neck portion 30*a* to the sidewall of the liner 22 and boring through the sidewall 22 to provide the opening. A cylindrical reinforcement member 12*a* is assembled around the neck portion 30*a* in the manner previously described with respect to the reinforcement member 12. The reinforcement member 12*a*, however, includes a radially-extending supporting foot 38*a* which is shaped to conform to the cylindrical sidewall of the liner 22. A plurality of bolt openings 70 are provided in the liner flange 32 and in the supporting flange 34 to cooperate with the bolts of a tank closure cap (not shown).

The present disclosure describes several embodiments of the invention, however, the invention is not limited to these embodiments. Other variations are contemplated to be within the spirit and scope of the invention and appended claims.

What is claimed is:

1. A filament-wound pressure vessel having a reinforced access opening comprising a blow-molded one piece liner having an outer surface defined by a cylindrical sidewall and oblate ellipsoidal ends, said liner defining at least one access opening into the vessel, said access opening having a cylindrical neck portion and a liner flange extending radially outwardly from an open distal end of said neck portion, and a cylindrical reinforcement member surrounding said cylindrical neck portion and having a supporting flange at one end thereof engaging an annular face of said liner flange, said reinforcement member having a radially extending supporting foot at another end thereof contacting the outer surface of said liner, said reinforcement member comprising a plurality of separate arcuate segments and a resin-impregnated filament winding covering said liner and said supporting foot.

2. A filament wound pressure vessel according to claim 1, wherein there are two semi-circular separable arcuate segments.

3. A filament wound pressure vessel according to claim 2, wherein each segment has a tongue portion which is received within a slot in an adjacent segment.

4. A filament wound pressure vessel according to claim 3, wherein said segments are held together by longitudinally extending pins which extend through said tongues.

5. A filament wound pressure vessel according to claim 1, wherein said reinforcement member is provided in said cylindrical sidewall.

* * * * *